March 1, 1960 F. W. MERRILL 2,927,229
ROTORS FOR PERMANENT MAGNET TYPE SYNCHRONOUS MOTORS
Filed July 25, 1956 3 Sheets-Sheet 1
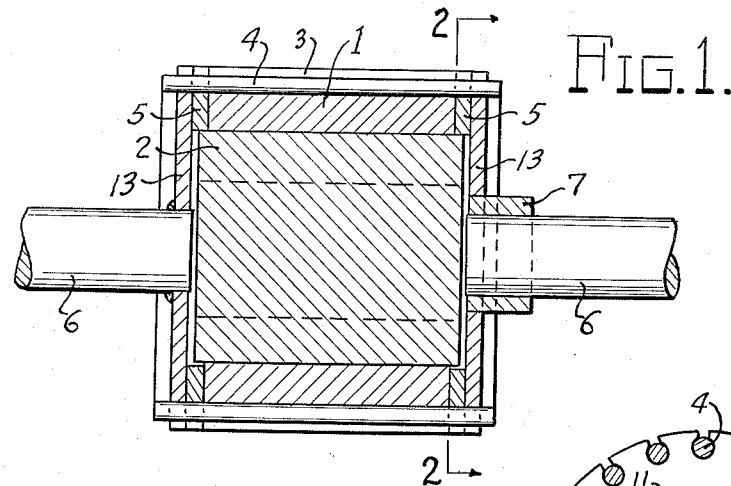
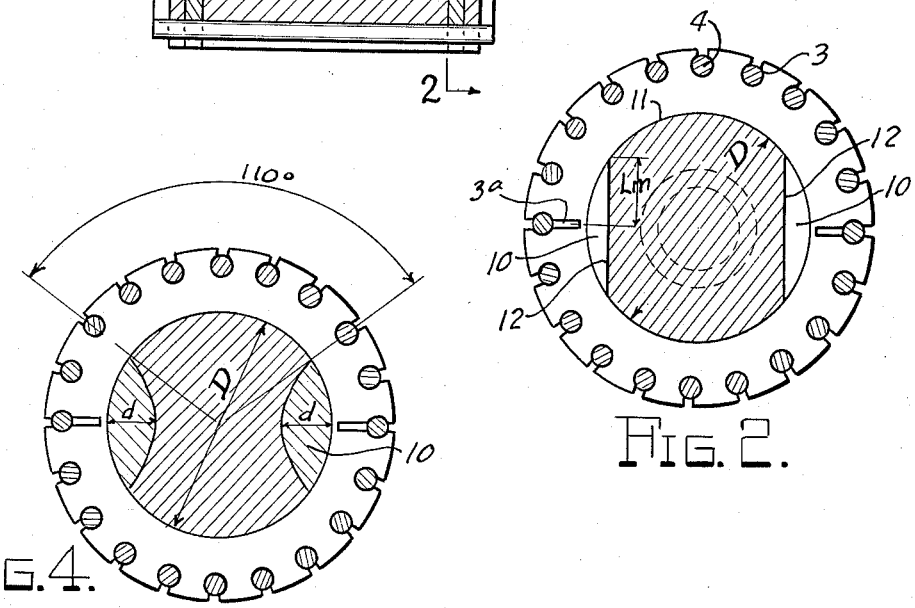
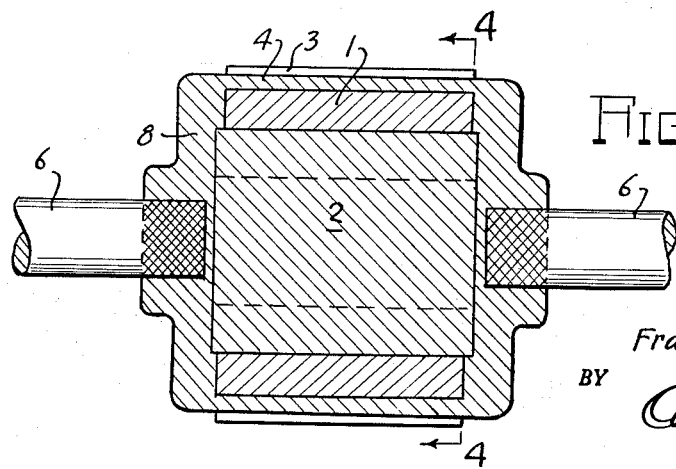
INVENTOR.
Frank W. Merrill
BY
Owen & Owen
ATTORNEYS March 1, 1960  F. W. MERRILL  2,927,229
ROTORS FOR PERMANENT MAGNET TYPE SYNCHRONOUS MOTORS
Filed July 25, 1956  3 Sheets-Sheet 2

INVENTOR.
Frank W. Merrill
BY
Owen & Owen
ATTORNEYS

March 1, 1960     F. W. MERRILL     2,927,229
ROTORS FOR PERMANENT MAGNET TYPE SYNCHRONOUS MOTORS
Filed July 25, 1956     3 Sheets-Sheet 3
FIG. 8.
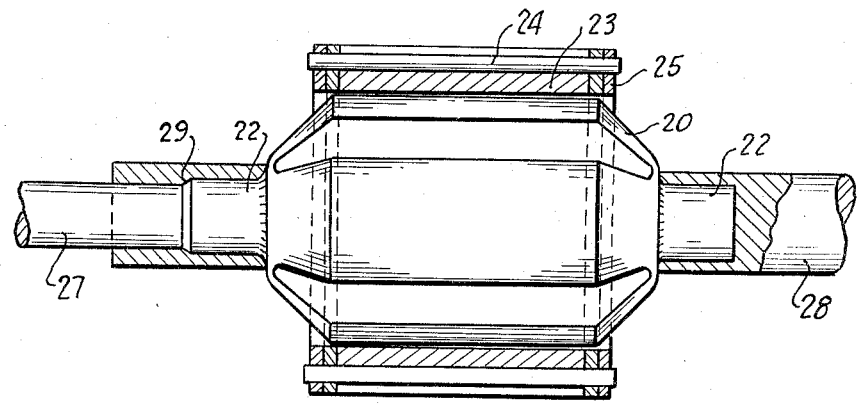
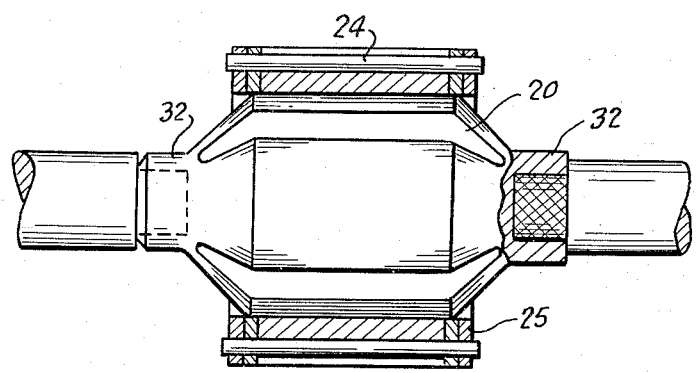
FIG. 9.
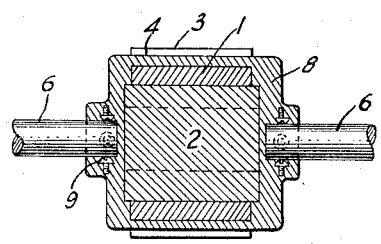
FIG. 10.
INVENTOR.
Frank W. Merrill
BY
Owen & Owen
ATTORNEYS

United States Patent Office 2,927,229
Patented Mar. 1, 1960

2,927,229

ROTORS FOR PERMANENT MAGNET TYPE SYNCHRONOUS MOTORS

Frank W. Merrill, Fort Wayne, Ind.

Application July 25, 1956, Serial No. 600,037

13 Claims. (Cl. 310—162)

This invention relates to rotors for permanent magnet type synchronous motors and is particularly directed to a construction in which the effective volume of the magnet material is significantly increased.

Known rotors for permanent magnet type synchronous motors comprise a permanent magnet block surrounded by a laminated sleeve in which slots are provided to receive the bars of a squirrel cage winding, which bars are short circuited by end rings. In these known rotors the rotor shaft has passed through the permanent magnet block and has thus reduced the useful volume of the magnet and resulted in a lower output than should be obtainable from a given rotor volume.

The present invention provides a rotor for a permanent magnet type synchronous machine in which the drive is transmitted to the shaft of the machine at the opposite ends of the rotor and the shaft does not pass through the magnet material. In one form of the invention two stub shafts are coaxially attached at opposite ends of the magnet material so that at least the center portion thereof underlying the laminated sleeve remains unobstructed and solid and in another form of the invention two stub shafts at opposite ends of the rotor are coaxially attached either directly or indirectly to the end rings which short circuit the squirrel cage windings.

According to another feature of the invention, the magnet material is so shaped as to define with the surrounding rotor laminations, interpolar spaces which resist the cross-demagnetizing action of the stator revolving field when the rotor is accelerating or pulling in or pulling out of synchronism. The less the demagnetization, the greater is the permanent magnet flux left in the rotor to provide greater maximum synchronous output and higher full load power factor and efficiency. The depth of these interpolar spaces of high reluctance (that is, the maximum distance from the internal circumference of the rotor laminations to the magnet) is advantageously about .2 to .3 of the inside rotor diameter.

It will be seen that the primary object of the invention is to increase the efficiency of the rotor for a permanent magnet type synchronous motor and that another object of the invention is to provide a rotor which is easy to manufacture and maintain and which will have a prolonged useful life.

Other objects and advantages of the invention will become apparent from the following description of preferred embodiments thereof, reference being had to the accompanying drawings, in which—

Fig. 1 is a central sectional view of a rotor embodying the present invention;

Fig. 2 is a section on line 2—2 of Fig. 1;

Fig. 3 is a central sectional view of a modified form of rotor;

Fig. 4 is a section on line 4—4 of Fig. 3;

Fig. 8 is a central sectional view, with the magnet in full lines, of a modified form of the invention;

Fig. 9 is a view similar to Fig. 8 in which the shafts are attached to the magnet block in a different manner; and Fig. 10 is a central sectional view of a modified form of rotor.

Figure 5:
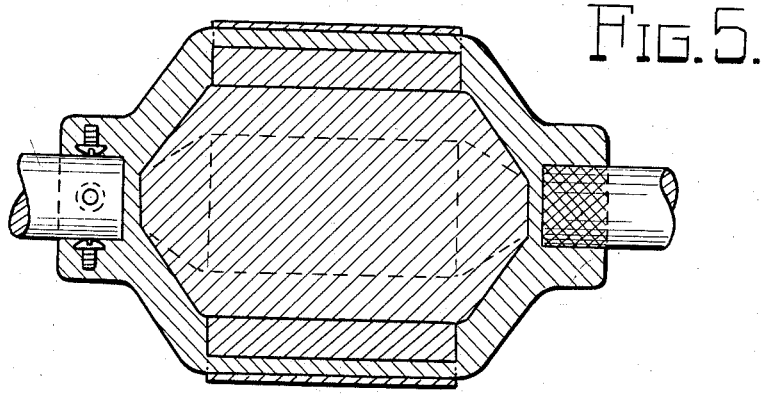
Fig. 5 is a central sectional view of a rotor of the modification of Fig. 3 in which a different magnet block is used.

The rotor in the forms shown in Figs. 1–5 is two-pole and comprising a pack of laminations 1 mounted on a suitably formed permanent magnet block 2, the laminations being formed with longitudinal slots 3 for the reception of the usual squirrel cage winding. Narrow interpolar radial slots 3a may be provided to divert a large percentage of the permanent magnet flux through the stator at synchronism and thereby improve the synchronous motor characteristics in a manner well known in the art. In the form shown in Fig. 1, the section of the magnet block 2 comprises two circular arcs 11 connected by parallel straight lines 12 so that a space 10 is left between the laminations and each side of the magnet. The magnet is magnetized after assembly in a direction parallel to the lines 12. These spaces 10 reduce cross-demagnetization when the rotor is running out of synchronism and its magnet poles are in slip relationship with the poles of the stator revolving field. If desired, the spaces 10 may be filled with non-magnetic material as hereinafter described.

In each form the magnet is solid, that is, there is no axial bore to receive a shaft as is the usual practice in the art.

In the form shown in Fig. 1, copper bars 4 are received in the lamination slots 3 and these bars are short circuited by end rings 5 which are formed with annular flanges 13 extending inwardly towards the center of the rotor.

As shown at the left hand side of Fig. 1 a shaft 6 is received as a press fit in the end ring flange 13 and is welded thereto. The shaft 6 is coaxial with the laminations 1. In the modification shown at the right hand side of Fig. 1, a sleeve 7 extends from the flange 13 and the shaft 6 is a press fit into this sleeve, the shaft being coaxially disposed with respect to the flange 13 and with respect to the opposite shaft 6.

In the form shown in Fig. 3 an aluminum squirrel cage winding is cast onto the magnet 2 and laminations 1. This winding has bars 4 received in the slots 3 and has end rings 8 cast integrally therewith. The cage is cast onto the shaft 6 and is keyed thereto for example by knurling the ends of the shaft as shown at the right hand side. Obviously, any suitable expedient may be employed to assure a firm non-slipping engagement of the ends of the coaxial shafts with the material of the cage flanges 8. Fig. 10 shows the use of projections 9 welded to the respective shaft sections 6 prior to casting the cage or end rings 8.

The spaces 10 in the interpolar regions of the magnet are high reluctance areas resistant to the forces of external demagnetization and cross-magnetization. In Figure 4, a form of magnet is shown which has a narrow waist so that in section it is of hour glass shape thus increasing the area and also the depth $d$ of the spaces 10. The depth $d$ of this space is usually between .2 and .25 of the magnet diameter but in special cases may run as high as .3 of the magnet diameter. In order to equalize the magnet area at the waist the ends of the magnet 8 may be made cone shaped as shown in Fig. 5. The high reluctance interpolar spaces 10 may be filled with the cast aluminum of the cage if it is desired to anchor the magnet more firmly in the rotor and to provide a non-magnetic material in this space.

Figure 6:
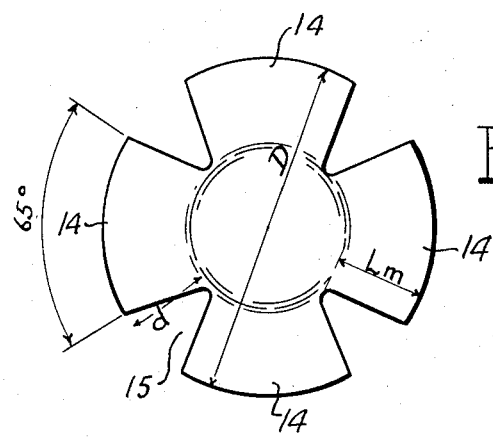
Fig. 6 is an end view of a four pole magnet block of the form shown in Fig. 7.
Figure 7:
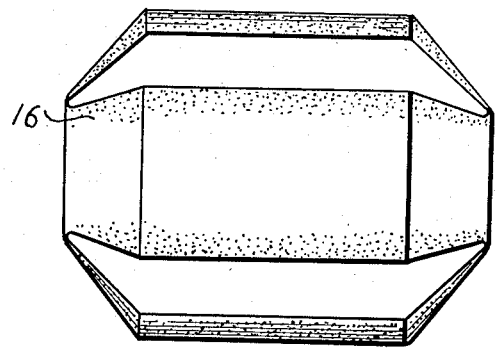
Fig. 7 is a side elevation of the magnet block shown in Fig. 6.

Figures 6 and 7 show a four-pole magnet for a rotor constructed in accordance with the present invention. In this form a solid integral magnet block having four poles 14 is used and between the poles 14 are deep interpolar cuts 15 of depth $d$ within the limits given above. These interpolar cuts 15 are the equivalent of the spaces 10 of the two-pole magnets shown in Figs. 1–5. If desired, the magnet area may be equalized by making the ends 16 thereof cone-shaped as shown in Fig. 7. The magnet is enclosed in a sleeve of laminations supporting a squirrel cage through which the drive to a shaft not passing through the magnet is taken as described with reference to Figures 1–5. Thus the cage may be fixed to the two coaxial stub shafts in any suitable manner as by casting it around projections extending from the shaft or by casting it around knurls or other deliberate serrations formed on the shaft prior to the casting operation.

It will be seen that, in all forms when the rotor is in use, the torque developed in it is transmitted directly from the cage to the two coaxial stub shafts. As no material has been removed from the magnet block for the reception of the shaft, the maximum volume of magnetic material is available and the output of the magnet is, therefore, high.

It will also be appreciated that the minimum magnet length (indicated by $L_m$ in the drawings) has been increased to the length of the sides of the relatively deep interpolar spaces as compared with rotors of known construction. This will decrease the percentage demagnetization of the rotor under a given set of operating conditions.

For two-pole rotors as shown in Figs. 1–5 the magnet polar angle is preferably about 110°, though it may be increased to 120°. For four-pole rotors as shown in Fig. 6 the magnet polar angle is preferably between 60 and 65°.

The construction described above may be termed a "cage drive" since the torque of the rotor is transmitted to the coaxial stub shafts through the medium of the end members of the cage, whether they be integrally cast with the squirrel cage bars or whether they be fixed to the bars as short circuiting end ring members in a known manner.

Another form of the invention in which coaxial stub shafts are connected to the rotor without boring the magnet block is shown in Figures 8 and 9. In this form a magnet 20 which may have any desired number of poles is cast with oppositely protruding end extensions 22. The laminations, designated 23, carry the usual squirrel cage bars 24 and the bars are interconnected with short circuiting end rings 25 so that each end of the rotor is open for the protrusion of the extensions 22. Any suitable connection may be made between the coaxial shafts which are designated 27 and 28 and the magnet end extensions. The end extensions of the magnet may be ground to true coaxial, cylindrical shape, and may be received within a suitable recess in the end of a shaft as shown at the right side of the figure, being held in place by a shrink or press fit, or a connection to the shaft end may be made by a separate sleeve 29 as shown at the left of the figure, the sleeve being received over the magnet extension and coupled over the end of the shaft. In this case the torque of the rotor is transmitted directly from the magnet to the respective shaft ends, the laminations of the rotor being held in place by press fitting them over the magnet or in any other known manner. The above construction, in which the shaft material surrounds projecting bosses of the magnet, is desirable, because it subjects the magnet material to compressive stresses only; which it is better able to resist than the tension stresses which would be set up if the shaft halves were pressed into holes in the ends of the magnet block.

The form of the invention shown in Figs. 8 and 9 may be termed a "magnet drive" and it will be seen that the available volume of the magnet material is not reduced by boring so that the flux producing capabilities of the magnet are fully realized.

It is preferred in use to magnetize the magnet material (Alnico VI) to such an extent that the flux density in the magnet, before motor operation, is in the order of 60,000 lines per square inch, and to so proportion the laminated members surrounding it, that the maximum flux density in the laminations, resulting from the above magnet flux, does not exceed 90,000 lines per square inch, which is well below the saturation point of the material of which the laminations are made. In the event that it is found advantageous to use a magnet material, such as Alnico V having a higher residual flux density; then the radial thickness of the laminated ring, under the bars, should be increased to maintain the 90,000 line maximum limit.

The limitation of maximum flux density in the ring is desirable, as it provides a low reluctance path, parallel to the path through the magnets, for the passage of such demagnetizing fluxes as may exist during the non-synchronous operation of the rotor, thus reducing the percentage demagnetization of the magnets due to the accelerating, pull in and pull out operations customarily accompanying motor operation.

Fig. 9 shows another form of the invention in which a magnet drive is used and in which only the end extensions, here designated 32, are formed for the reception of the ends of the coaxial shafts. The shafts may be attached in any suitable manner as by casting the magnet around the end of the shaft initially or by inserting the end of the shaft in a cast opening or recess in the magnet end extension. If this last expedient is used care must be taken to avoid a press fit between the end of the shaft and the recess in the magnet because of the brittleness of the magnet material.

While the invention has been disclosed in conjunction with a specific form and disposition of the parts, it should be expressly understood that it is capable of numerous modifications and changes without departing from the scope of the appended claims.

What I claim is:

1. A rotor for a synchronous induction motor comprising, a rotor body including a formed block of magnet material, a sleeve of laminations surrounding said magnet block, squirrel cage bars embedded in said sleeve, short circuiting end rings for said bars, and separate coaxial rotor shafts supporting said rotor body at each end, whereby the central volume of said magnet block is solid and uninterrupted at least in the areas axially underlying said laminations.

2. A rotor for a synchronous induction motor comprising, a rotor body including a formed block of magnet material, a sleeve of laminations surrounding said magnet block, squirrel cage bars embedded in said sleeve, short circuiting end rings integral with said squirrel cage bars, and separate coaxial rotor shafts supporting said rotor body at each end, whereby the central volume of said magnet block is solid and uninterrupted at least in the areas axially underlying said laminations.

3. A rotor for a synchronous induction motor comprising, a rotor body including a formed block of magnet material, a sleeve of laminations surrounding said magnet block, squirrel cage bars embedded in said sleeve, short circuiting end rings for said bars extending radially inward beyond said laminations, and separate coaxial rotor shafts attached to said end rings and supporting said rotor body at each end, whereby the central volume of said magnet block is solid and uninterrupted at least in the areas underlying said laminations.

4. A rotor for a synchronous induction motor comprising, a rotor body including a formed block of magnet material, a sleeve of laminations surrounding said magnet block, squirrel cage bars embedded in said sleeve, short circuiting end rings integral with said squirrel cage bars and extending radially inward beyond said laminations to form with said laminations an integral cage surrounding said magnet block, and separate coaxial rotor shafts supporting said rotor body at each end, whereby the central volume of said magnet block is solid and uninterrupted at least in the areas axially underlying said laminations.

5. A rotor for a synchronous induction motor comprising, a rotor body including a formed block of magnet material, a sleeve of laminations surrounding said magnet block, squirrel cage bars embedded in said sleeve, short circuiting end rings integral with said squirrel cage bars and extending radially inward beyond said laminations to form with said laminations an integral cage surrounding said magnet block, and separate coaxial rotor shafts attached to said cage and supporting said rotor body at each end, whereby the central volume of said magnet block is solid and uninterrupted within said cage.

6. A rotor for a synchronous induction motor comprising, a rotor body including a formed block of magnet material having peripheral pole portions and oppositely directed axial extensions, a sleeve of laminations surrounding the pole portions of said magnet block, squirrel cage bars embedded in said sleeve, short circuiting end rings for said bars, and separate coaxial rotor shafts attached to said oppositely directed axial extensions of said magnet block for supporting said rotor body, whereby the central volume of said magnet block is solid and uninterrupted at least in the areas axially underlying said laminations.

7. A permanent magnet rotor for a synchronous induction motor comprising a permanent magnet block, a laminated sleeve surrounding said block, squirrel cage bars positioned in slots in said laminated sleeve, end rings secured to the bars to form therewith a short circuited winding, and a pair of coaxial shafts, each rigidly connected to an end ring at opposite ends of the cage.

8. A permanent magnet rotor according to claim 7 in which the shafts have a press fit in the end rings and are welded thereto.

9. A permanent magnet rotor according to claim 7 in which the end rings are cast around the ends of said shafts.

10. A permanent magnet rotor according to claim 7 and having an interpolar space of high reluctance between the magnet and the laminations at each side of the magnetic axis whereby cross-demagnetization during acceleration of the rotor is reduced.

11. A permanent magnet rotor according to claim 10 in which the depth of the interpolar space is between about .2 and .25 of the inside diameter of the laminated sleeve.

12. A permanent magnet rotor according to claim 11 in which the magnet is of hour glass section having a narrow waist.

13. A permanent magnet rotor according to claim 7 in which the magnet comprises more than one pair of poles, adjacent poles being separated by interpolar spaces having a depth between .2 and .3 of the inside diameter of the laminated sleeve.

References Cited in the file of this patent

UNITED STATES PATENTS

| | | |
|---|---|---|
| 1,275,292 | Neuland | Aug. 13, 1918 |
| 1,798,571 | Walther | Mar. 31, 1931 |
| 2,192,985 | Reis | Mar. 12, 1940 |
| 2,303,893 | Mullner | Dec. 1, 1942 |
| 2,519,895 | Edwards | Aug. 22, 1950 |
| 2,525,456 | Merrill | Oct. 10, 1950 |
| 2,643,350 | Merrill | June 23, 1953 |
| 2,703,849 | Worth | Mar. 8, 1955 |

FOREIGN PATENTS

| | | |
|---|---|---|
| 656,773 | Germany | Feb. 14, 1938 |
| 700,286 | Germany | Dec. 17, 1940 |
| 749,480 | Great Britain | May 23, 1956 |
| 786,004 | France | May 27, 1935 |
| 970,524 | France | June 21, 1950 |